(12) United States Patent
Glucksman et al.

(10) Patent No.: US 6,555,795 B2
(45) Date of Patent: Apr. 29, 2003

(54) ELECTRIC COOKING APPLIANCE WITH REVERSIBLE COOKING ELEMENTS

(75) Inventors: Dov Z. Glucksman, Wenham, MA (US); Gary P. McGonagle, Lynn, MA (US); Laura P. Nickerson, Andover, MA (US)

(73) Assignee: Appliance Development Corporation, Danvers, MA (US)

( * ) Notice: Subject to any disclaimer, the term of this patent is extended or adjusted under 35 U.S.C. 154(b) by 0 days.

(21) Appl. No.: 09/839,578

(22) Filed: Apr. 20, 2001

(65) Prior Publication Data
US 2002/0153366 A1 Oct. 24, 2002

(51) Int. Cl.$^7$ .............................. H05B 3/68; H05B 3/06; A47J 3/00
(52) U.S. Cl. .................... 219/450.1; 219/524; 219/525; 99/372; 99/378
(58) Field of Search ......................... 219/450.1, 451.1, 219/468.1, 468.2, 524, 544; 99/372, 339, 340, 377, 378, 379, 380

(56) References Cited

U.S. PATENT DOCUMENTS

| | | | |
|---|---|---|---|
| 1,450,277 A | 4/1923 | Brown et al. | |
| 1,587,788 A | * 6/1926 | Morley | 99/376 |
| 1,754,486 A | * 4/1930 | Schott | 99/372 |
| 2,102,879 A | 12/1937 | Benson | |
| 2,840,684 A | * 6/1958 | Watkins, Jr. | 219/450.1 |
| 2,899,888 A | 8/1959 | Koci | 99/331 |
| 3,377,942 A | * 4/1968 | Carbon | 99/376 |
| 3,632,982 A | * 1/1972 | Linger | 219/448.17 |
| 3,998,145 A | 12/1976 | Maisch | 99/339 |
| 4,011,431 A | 3/1977 | Levin | 219/524 |
| 4,150,609 A | 4/1979 | McClean | 99/372 |
| 4,700,619 A | 10/1987 | Scanlon | 99/349 |
| 5,197,377 A | 3/1993 | Jennings et al. | 99/347 |
| 5,615,604 A | 4/1997 | Chenglin | 99/332 |
| 5,768,994 A | 6/1998 | Bobo | 99/374 |

* cited by examiner

Primary Examiner—Sang Paik
(74) Attorney, Agent, or Firm—George A. Herbster

(57) ABSTRACT

An electric cooking appliance with reversible cooking elements. A base carries two pivoted contact boxes. Each contact box includes a support surface for receiving a cooking element including a sleeve for supporting the cooking element on the contact box. Each cooking element is molded with an integral, internal heating element and desired cooking surfaces. Reversal of cooking surfaces is accomplished by removing, flipping and reversing the cooking element with its internal heating element on its contact box.

29 Claims, 14 Drawing Sheets

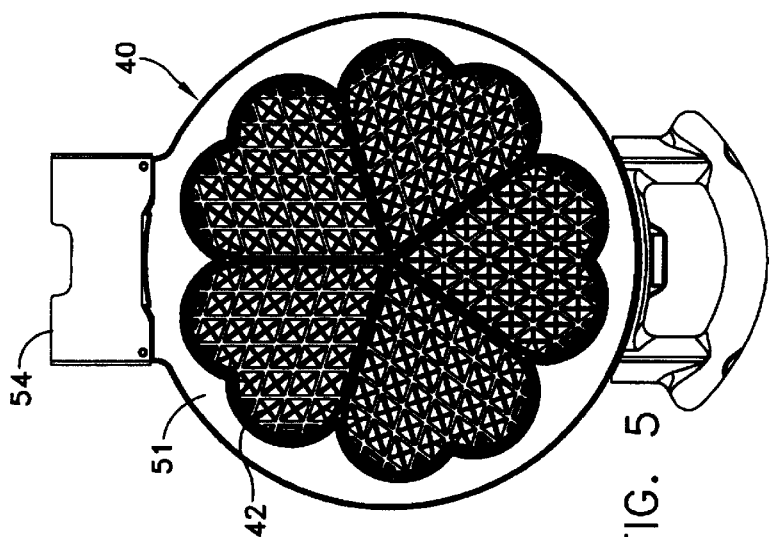
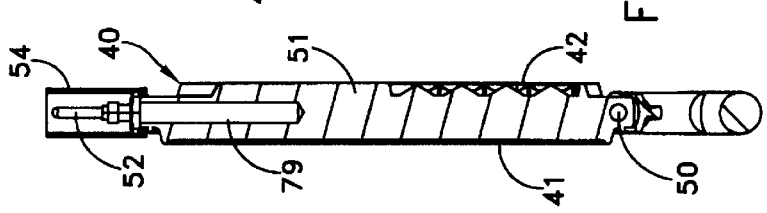
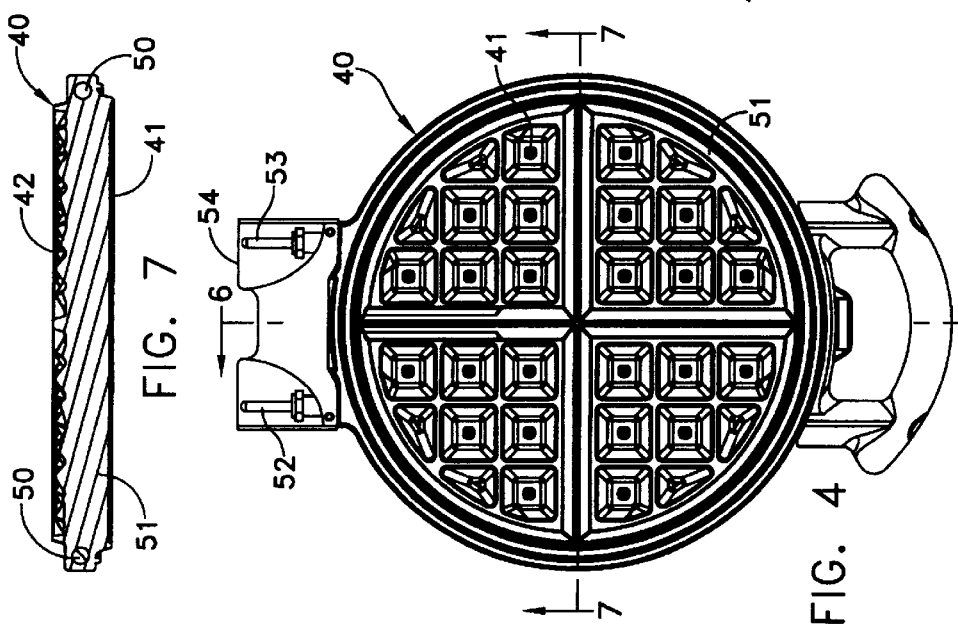

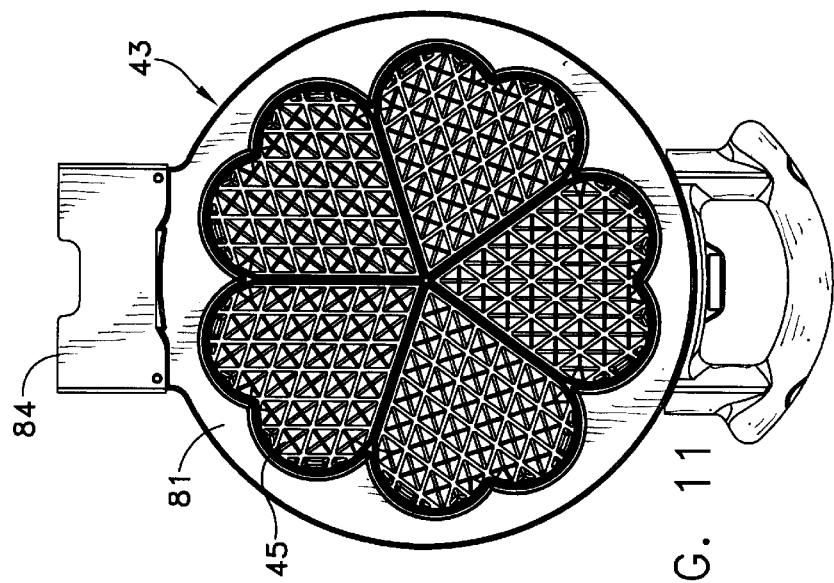
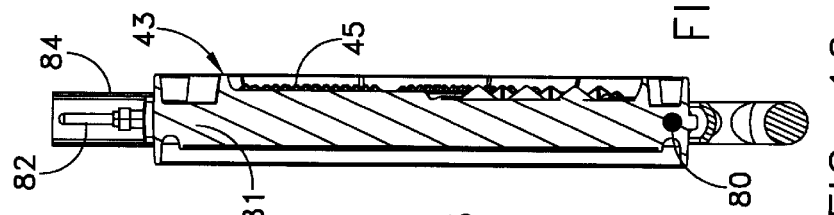
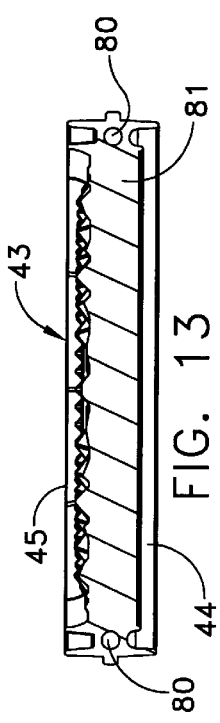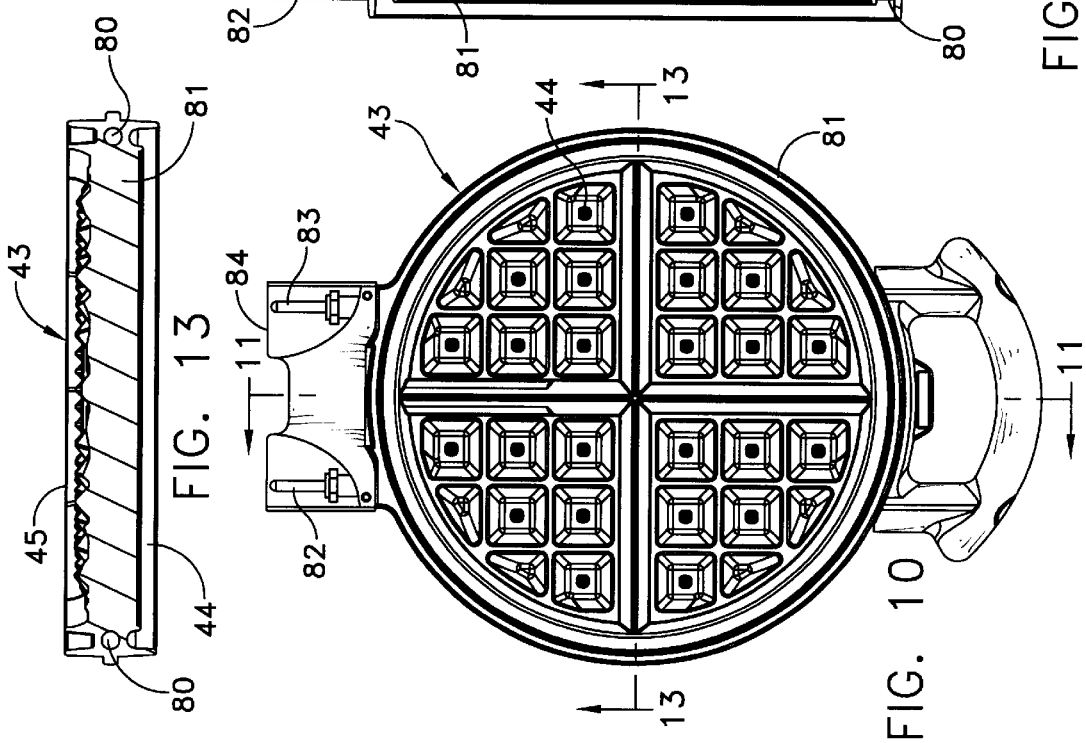
FIG. 11
FIG. 12
FIG. 13
FIG. 10

ELECTRIC COOKING APPLIANCE WITH REVERSIBLE COOKING ELEMENTS

BACKGROUND OF THE INVENTION

1. Field of the Invention

This invention generally relates to cooking appliances that include reversible grids for cooking different types of food. More specifically, this invention relates to home cooking appliances, such as waffle irons and grills, that can cook two different types of food by means of reversible cooking surfaces.

2. Description of Related Art

A variety of cooking appliances permit cooking of different foods by the use of reversible cooking elements. U.S. Pat. No. 2,899,888 (1959) to Koci discloses one such cooking appliance in the form of a combined waffle baker and grill. This particular appliance has two hinged cases. Each case contains a radiant heating element to one side of a cooking grid. Each grid has a flat cooking surface on one side and waffle cooking surface on the other. To change from one surface to another, each grid is reversed and reinserted into its corresponding case. It has been found that cooking appliances, such as shown in the Koci patent, that use radiant heating of one side of the cooking grid produce uneven heating of the grid and inefficient heat transfer that leads to longer baking times.

Temperature control of a baking surface, as shown in the Koci patent, is obtained by sensing the temperature of separate thermal mass that possess characteristics similar to the cooking grid. This approach does not always provide accurate temperature control of the heating elements themselves.

Reversing the grids requires the grids to be removed. This procedure exposes the heating elements, such as direct heating wires that are subject to damage if contacted. This feature further makes it difficult to clean the interior of such cooking appliances.

U.S. Pat. No. 3,998,145 (1976) to Maisch discloses a combination grilling and baking apparatus with two parts hinged by a pantograph like device. Each part carries a cooking element that has different cooking surfaces. The Maisch patent discloses waffle baking and meat grilling surfaces. Each cooking unit has a central elongated and transverse sleeve. Each hinge part carries a heating element. When a cooking element is installed the heating element inserts into the sleeve.

This apparatus seems to use a conventional bi-metal control for temperature. Like the device shown in the Koci patent, the combination grilling and baking apparatus disclosed in the Maisch patent requires direct handling of the cooking elements and exposure of the heating element when a cooking element is removed for reversal. Further, even with the cooking elements removed, the heating element makes it difficult to clean the remainder of the cooking appliance.

SUMMARY

Therefore it is an object of this invention to provide two reversible cooking surfaces that permit accurate temperature control with even heating.

Another object of this invention is to provide an electrical appliance with two reversible cooking surfaces that enables the reversal of the cooking surfaces without exposing any heating elements.

Yet another object of this invention is to provide an electrical appliance with two reversible cooking surfaces that facilitates cleaning of the entire appliance.

Still another object of this invention is to provide a cooking appliance in the form of a waffle iron that can cook two different types of waffles on reversible surfaces with accurate cooking of such waffles.

In accordance with this invention, an electrical cooking appliance includes a base. A first assembly hinges for rotation on the base about a first axis and the first assembly includes a contact box that electrically and mechanically supports a first two-sided detachable cooking element with an integral, embedded heating element. A second assembly hinges for rotation on the base about a second axis that is parallel to and spaced above the first axis. The second assembly includes a contact box that electrically and mechanically supports a second two-sided detachable cooking element with an integral, centrally embedded heating element. The second contact box includes a controller for the energization of the first and second heating elements.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 4 through 7 are plan and section views through various portions of a top cooking element shown in FIGS. 1 through 3;

FIGS. 10 through 13 are plan and section views through various portions of a bottom cooking element shown in FIGS. 1 through 3;

DESCRIPTION OF ILLUSTRATIVE EMBODIMENTS

Figure 1:
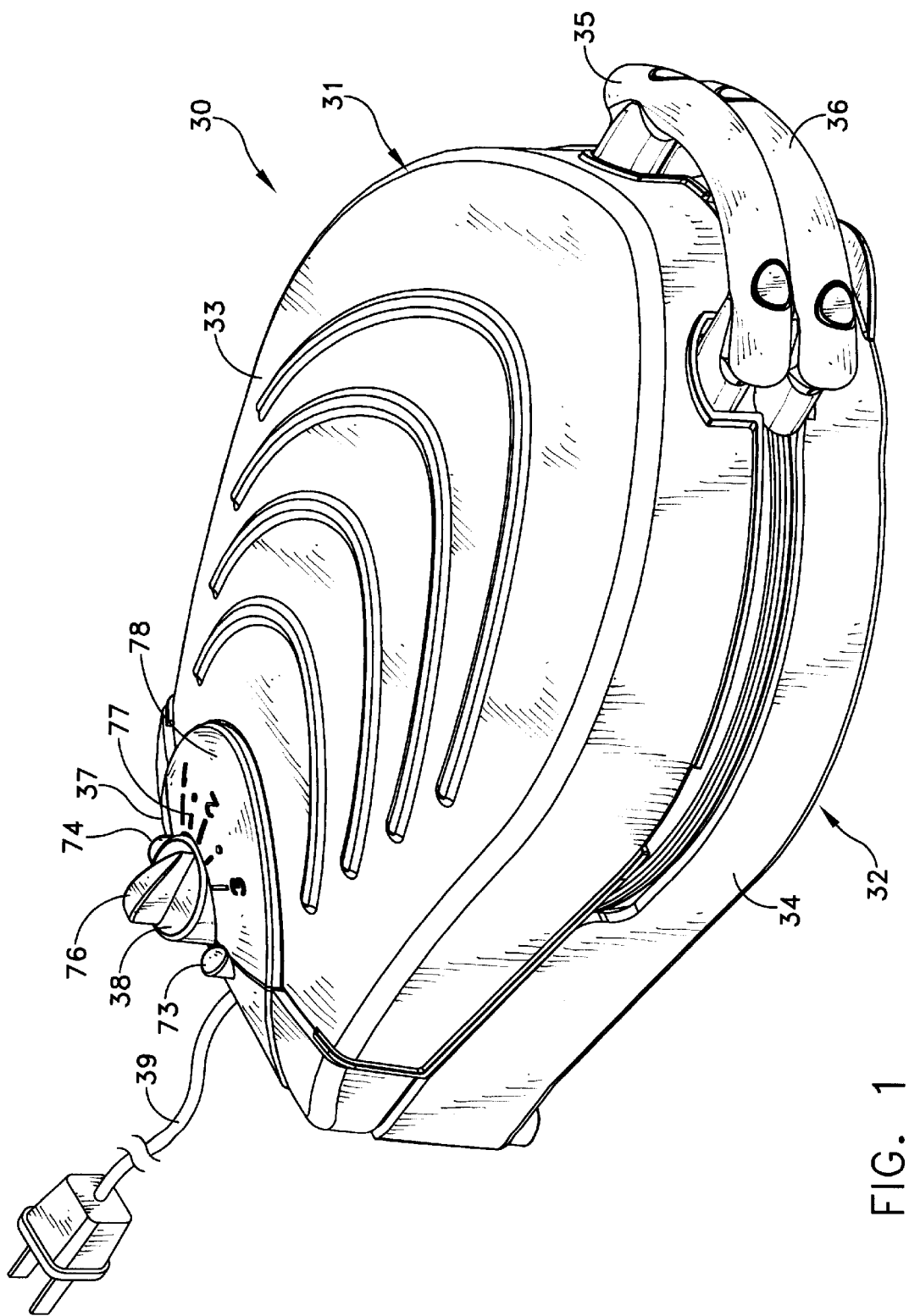
FIG. 1 is a perspective view of a waffle iron as an example of a cooking appliance that incorporates this invention.

FIG. 1 depicts a waffle iron 30 with a top assembly 31 and a bottom assembly 32. The top assembly 31 includes a detachable cover 33; the bottom assembly includes a base 34. Handles 35 and 36 attach to upper and lower cooking elements. The upper assembly additionally includes a support 37 that carries a thermostat represented by a temperature control knob 38. The base 34 receives a power cord 39.

Figure 2:
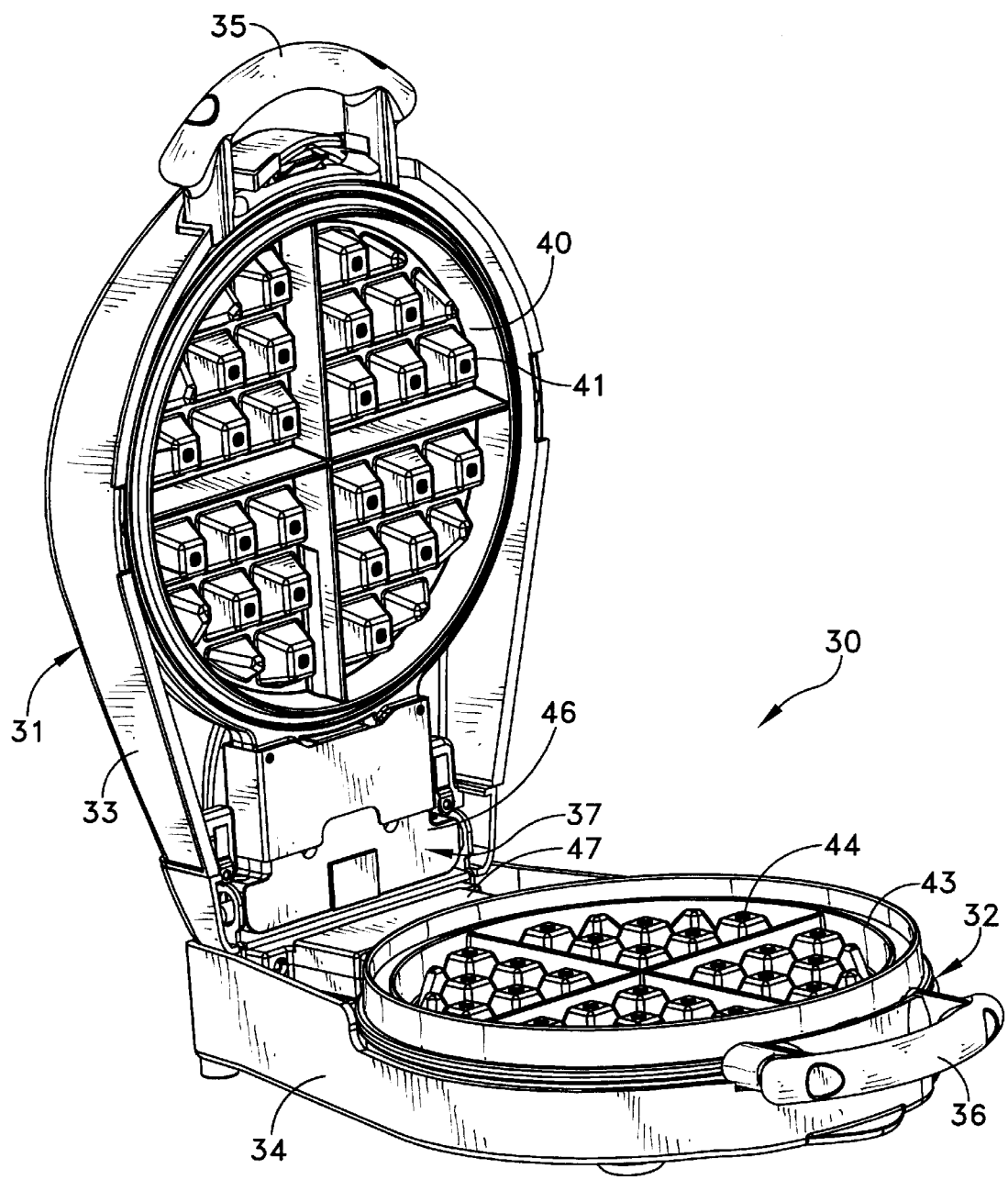
FIG. 2 is a perspective view of the waffle iron in a loading orientation with a first cooking surface configuration.
Figure 3:
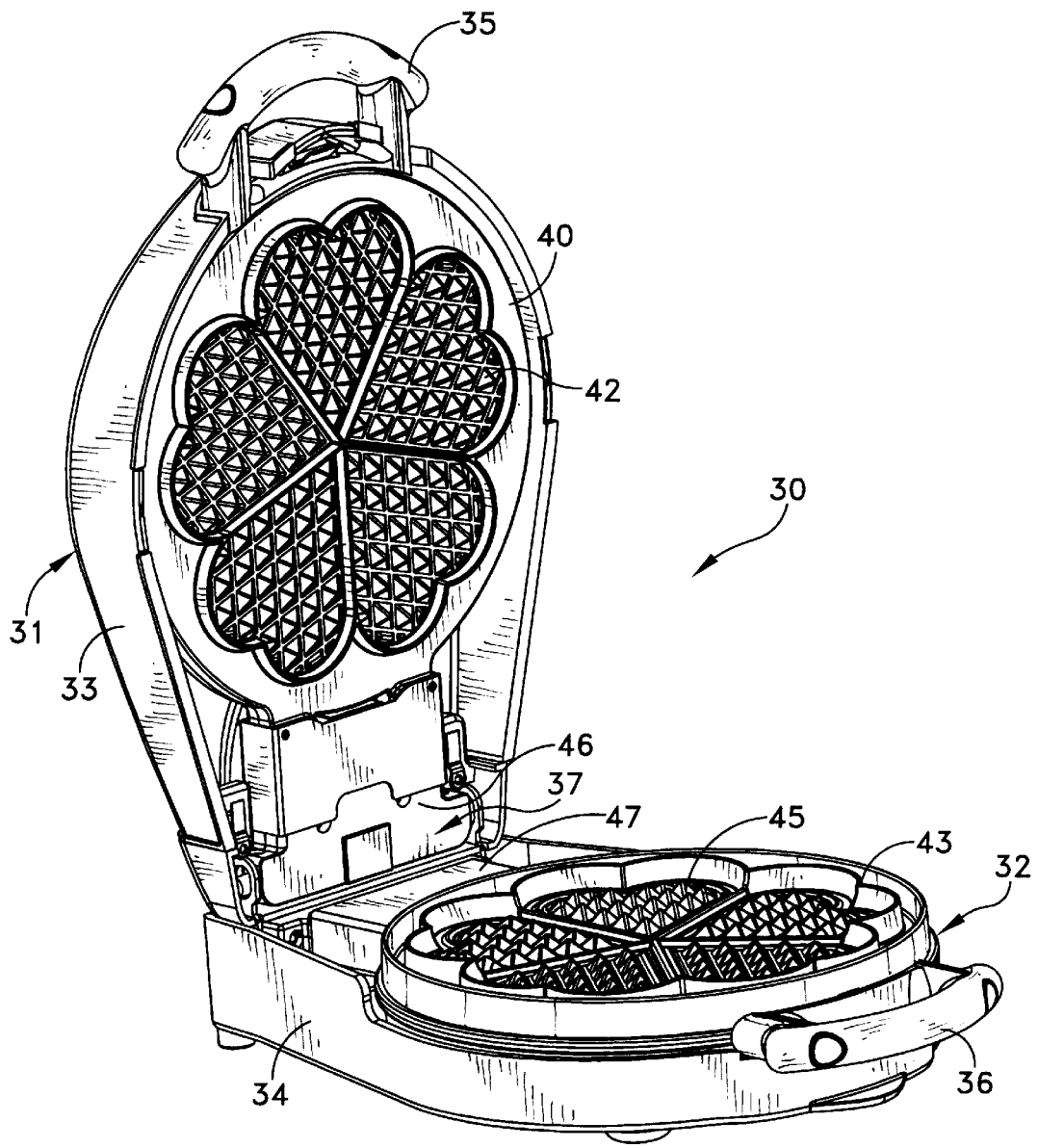
FIG. 3 is a perspective view of the waffle iron in a loading orientation with a second cooking surface configuration.

Elevating the handle 35 raises the upper assembly 31 to a position shown in FIGS. 2 and 3. In FIG. 2 the handle 35 connects to a top cooking element 40 with an exposed Belgium waffle cooking surface 41. FIG. 3 discloses a reversible "five of hearts" cooking surface 42 on the top cooking element 40.

Similarly, FIG. 2 depicts a bottom cooking element 43 attached to the handle 36 with an exposed Belgian waffle cooking surface 44. FIG. 3 depicts a corresponding "five of hearts" cooking surface 45. As will become apparent, the Belgium waffle and five of hearts cooking surfaces are merely representative of two diverse surfaces.

Changing from one cooking surface to the other is a simple process. In the position shown in FIGS. 2 and 3, the cover 33 is detached first. Then the handle 35 is lifted whereupon the top cooking element 40 separates from a contact box 46 that provides electrical and mechanical support for the top cooking element 40. When the top cooking element 40 is clear of the contact box 46 it can be rotated or flipped and reinserted thereby to transform the cooking surface from the surface 41 in FIG. 2 to the surface 42 in FIG. 3.

For the bottom cooking element 43, it is merely necessary to elevate the handle 36 until the bottom cooking element 43 pivots to clear the base 34, as more clearly described later. Then the handle 36 can be pulled to withdraw bottom cooking element 43 from its electrical and contact box 47, flipped and reinserted. Thus, the change of cooking surfaces to that shown in FIG. 2 to that shown in FIG. 3 and vice versa is a simple and quick operation.

Now referring to a more detailed description of the waffle iron 30 in FIG. 1, FIGS. 4 through 7 depict the construction of the top cooking element 40. The top cooking element 40 is heated by an electric heater 50 embedded at a central plane through a cast aluminum body 51 that is molded with the desired surfaces, such as the surfaces 41 and 42. The surfaces may be coated with a nonstick material, such as Teflon® or other like material. The electric heater 50 follows a circular path between two male electrical connectors 52 and 53. The path lies close to the periphery of the aluminum body 40 as particularly shown in FIGS. 6 and 7. This configuration and placement ensures that no direct contact is made between the heater and the waffle because that would create a hot spot and provides uneven heating. Heat travels uniformly from a perimeter of a disk towards its center with relatively little loss in temperature as the area of heat loss diminishes proportionally to the second power of the distance the heat travels toward the center. In a waffle maker the largest amount waffle dough is concentrated at the outer region of the plate, less heat is needed in the center of the plate.

A rectangular sleeve 54 protects the male electrical connectors 52 and 53 when the top cooking element 40 is removed from its contact box 46. When the top heating element 40 is inserted, the sleeve 54 covers the end of the contact box 46 for mechanical support. The male electrical connectors 52 and 53 mate with female electrical connectors in the contact box 46.

Figure 8:
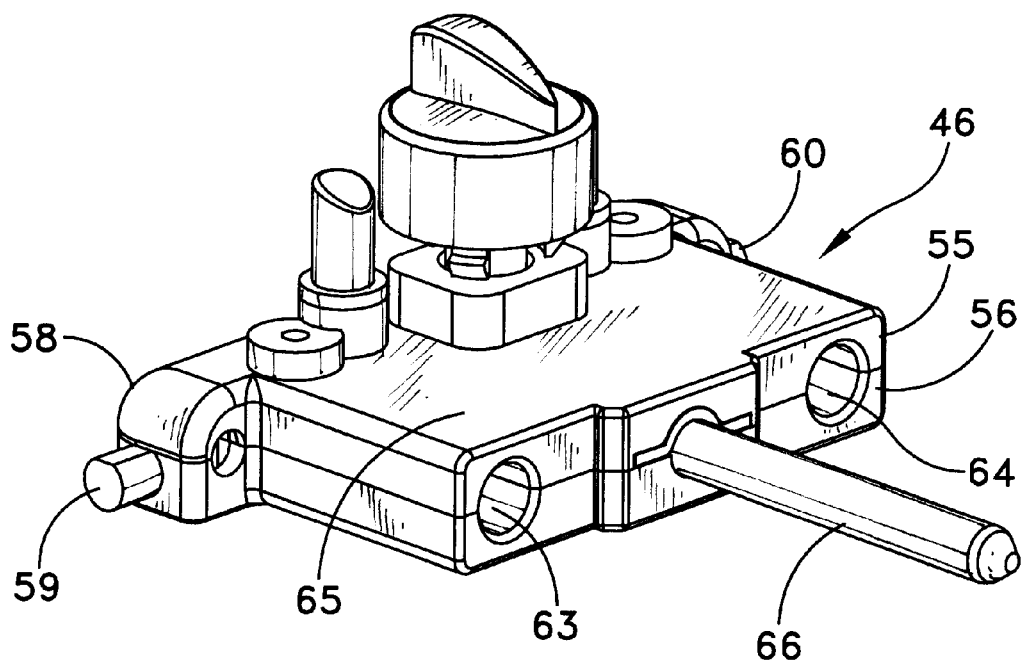
FIGS. 8 and 9 depict a contact box for use with the top cooking element shown in FIGS. 4 through 7.
Figure 9:
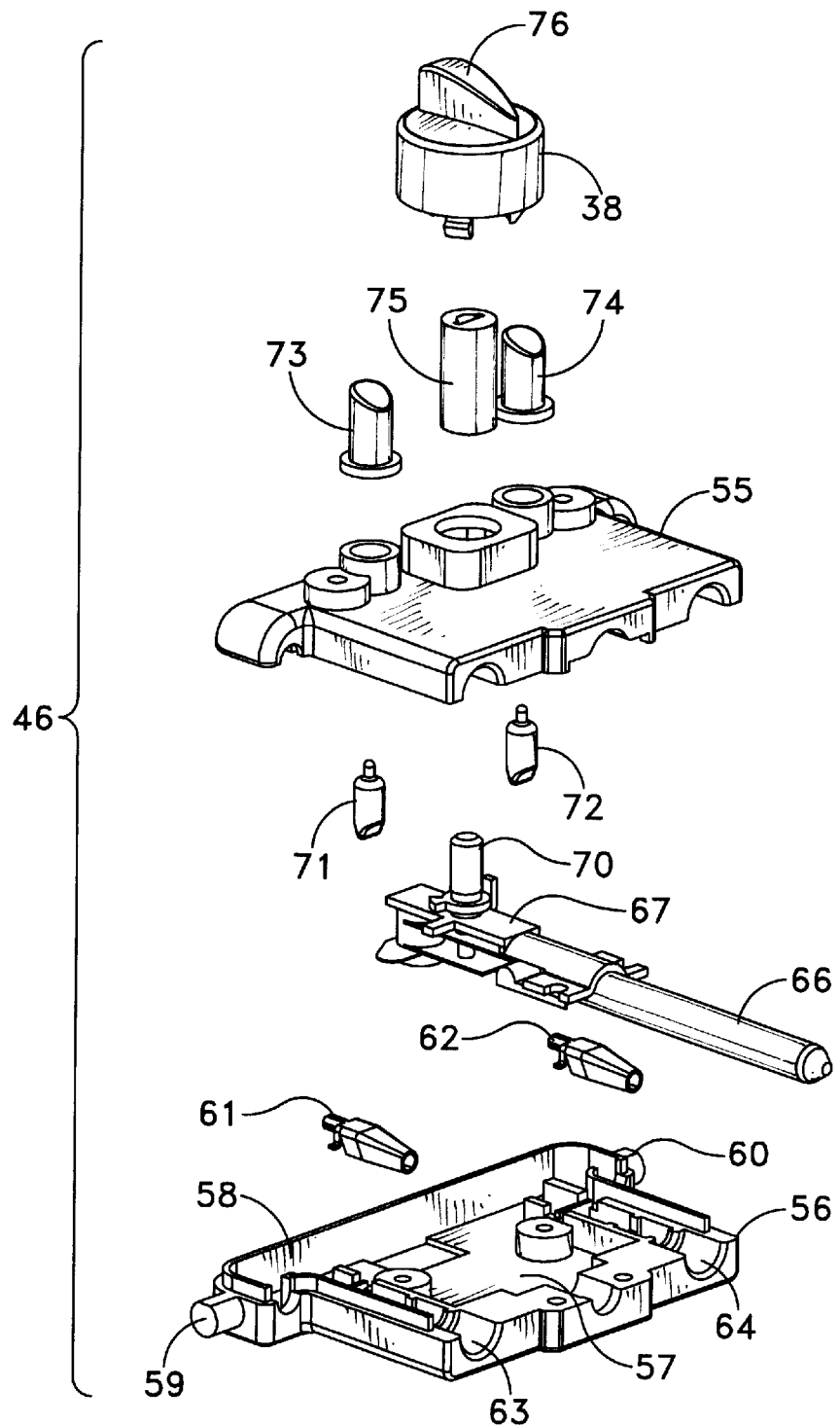

FIGS. 8 and 9 depict one embodiment of a top contact box 46 with upper and lower housings 55 and 56. The lower support housing includes a cavity 57 and a transverse portion 58 that terminates in pivots 59 and 60. The base 56 carries a pair of spaced female contacts 61 and 62 that are accessible through openings 63 and 64 to the male electrical connectors 52 and 53 as the sleeve 54 slides over the surface 65 of the assembled housings 55 and 56. The upper and lower housings 55 and 56 additionally support a thermal sensor 66 that extends from a thermostatic control 67 with an adjustment shaft 70. A pair of neon lamps 71 and 72 indicate two states. Lamp 72 indicates that power is applied.

Lamp 71 indicates that the heating elements have reached the selected temperature. When this unit is assembled, lenses 73 and 74 attach to the upper housing 55 to provide an external indication of the power state as can be seen from FIG. 1.

The thermostat control knob 38 attaches to a shaft coupling 75 that connects to the thermostat adjustment shaft 70. A pointer 76 on the control knob 38 identifies a cooking level by pointing at indices 77 on a surface 78.

Referring again to FIGS. 4 through 6 and particularly FIG. 6, the top cooking element 40 additionally includes a well 79 that receives the thermal sensor probe 66. Thus in accordance with another aspect of this invention, the temperature of the top and bottom cooking elements 40 and 43, as shown in FIG. 3, are determined by a direct measurement of the temperature of the top cooking element 40.

FIGS. 10 through 13 depict the bottom cooking element 43 that has an analogous structure to the top cooking element 40. More specifically, the bottom cooking element 43 includes an electric heater 80 embedded in a body 81. Like the heater 50 shown in FIGS. 6 and 7, the heater 80 is embedded at a central plane in a cast aluminum body 81 with the molded surfaces 44 and 45. The heater 80 follows a circular path adjacent the periphery of the cooking element 43 counterclockwise from a male connector 82 to a male connector 83 that is internal to a rectangular sleeve 84. Like the sleeve 54 in FIGS. 4 through 6, the sleeve 84 protects the contacts 82 and 83 when the bottom cooking element 43 is removed from its contact box 47 and provides mechanical support for the bottom cooking element 43 when it is positioned on the contact box 47. Like the top cooking element 40, the bottom cooking element 43 may also be coated with a nonstick material such as Teflon®.

Figure 14:
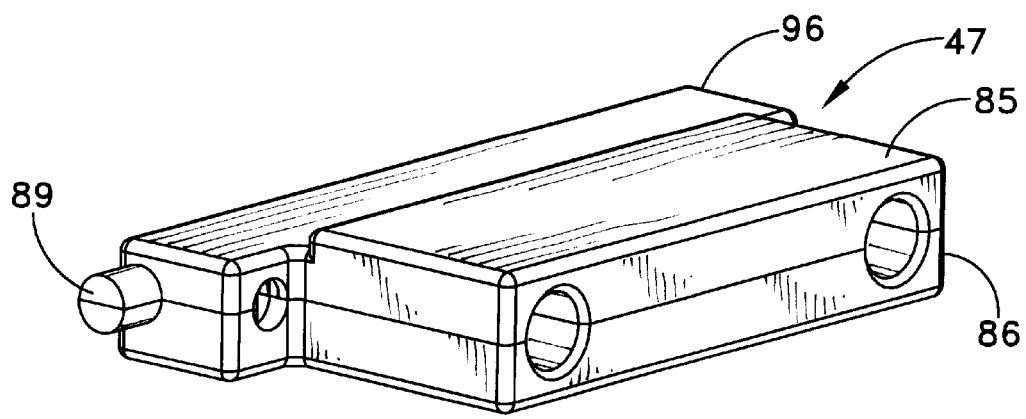
FIGS. 14 and 15 depict a contact box for use with the bottom cooking element shown in FIGS. 10 through 13.
Figure 15:
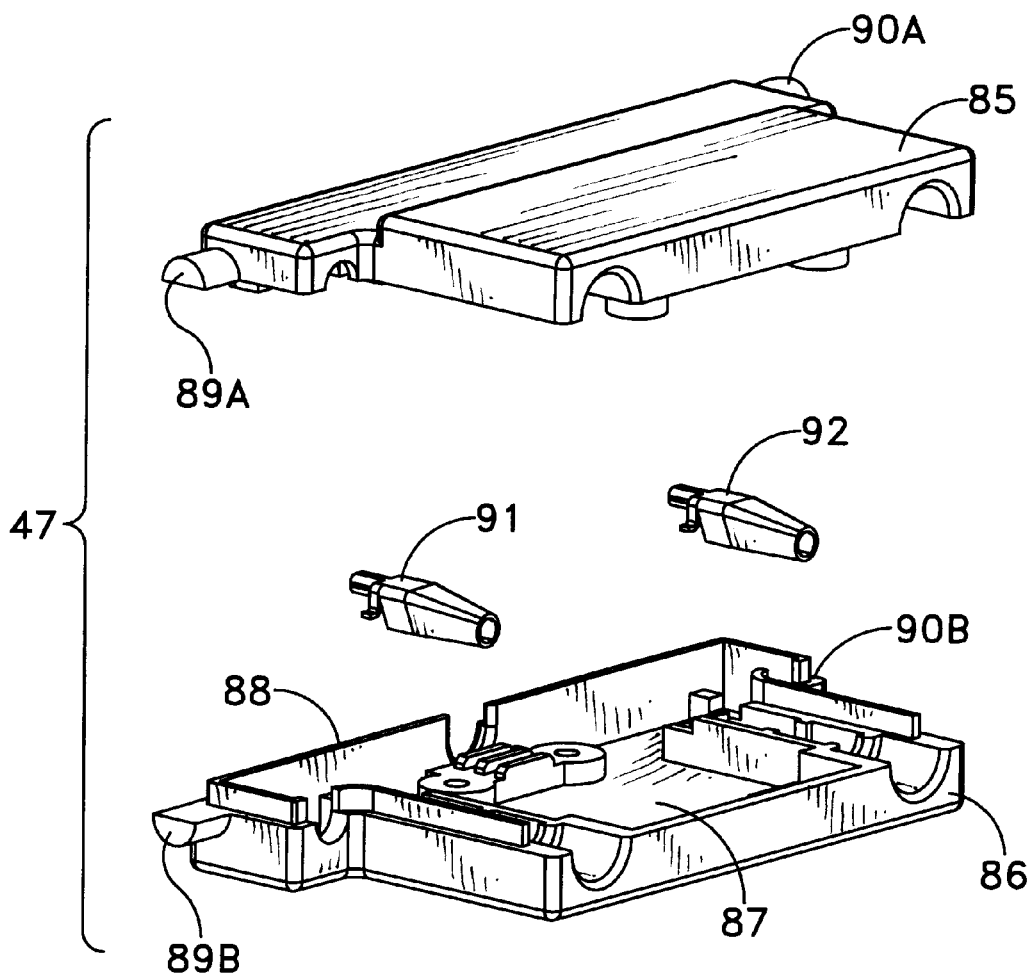

FIGS. 14 and 15 depict the bottom contact box 47. It includes an upper housing 85 and a lower housing 86. The lower housing 86 has a cavity 87 and a transverse section 88 that terminates with pivots formed when sections 89A and 90A on the upper housing 85 mate with sections 89B and 90B in the lower housing 86. The cavity 87 carries two female electrical connectors 91 and 92 receive the male connectors 82 and 83 on the bottom cooking element 43. The female connectors 91 and 92 also connect to conductors from the power cord 39 shown in FIG. 1 and to the female connectors 61 and 62 in FIG. 9. As a result the heaters 50 and 80 operate in parallel under thermostatic control. As will be apparent, each conductor will attach to its respective control box with appropriate strain relief components or measures.

By casting the top and bottom cooking elements, it is possible to seal each of the male connectors in the cooking elements, such as the male connectors 52 and 53 for the top cooking element 40 and the male connectors 82 and 83 for the bottom cooking element 43. Consequently, the cooking elements are not subject to damage by immersion in water. Consequently, it is possible to construct both the cooking elements 41 and 43 to be removed from the appliance 30 and cleaned in a dishwasher.

Figure 16:
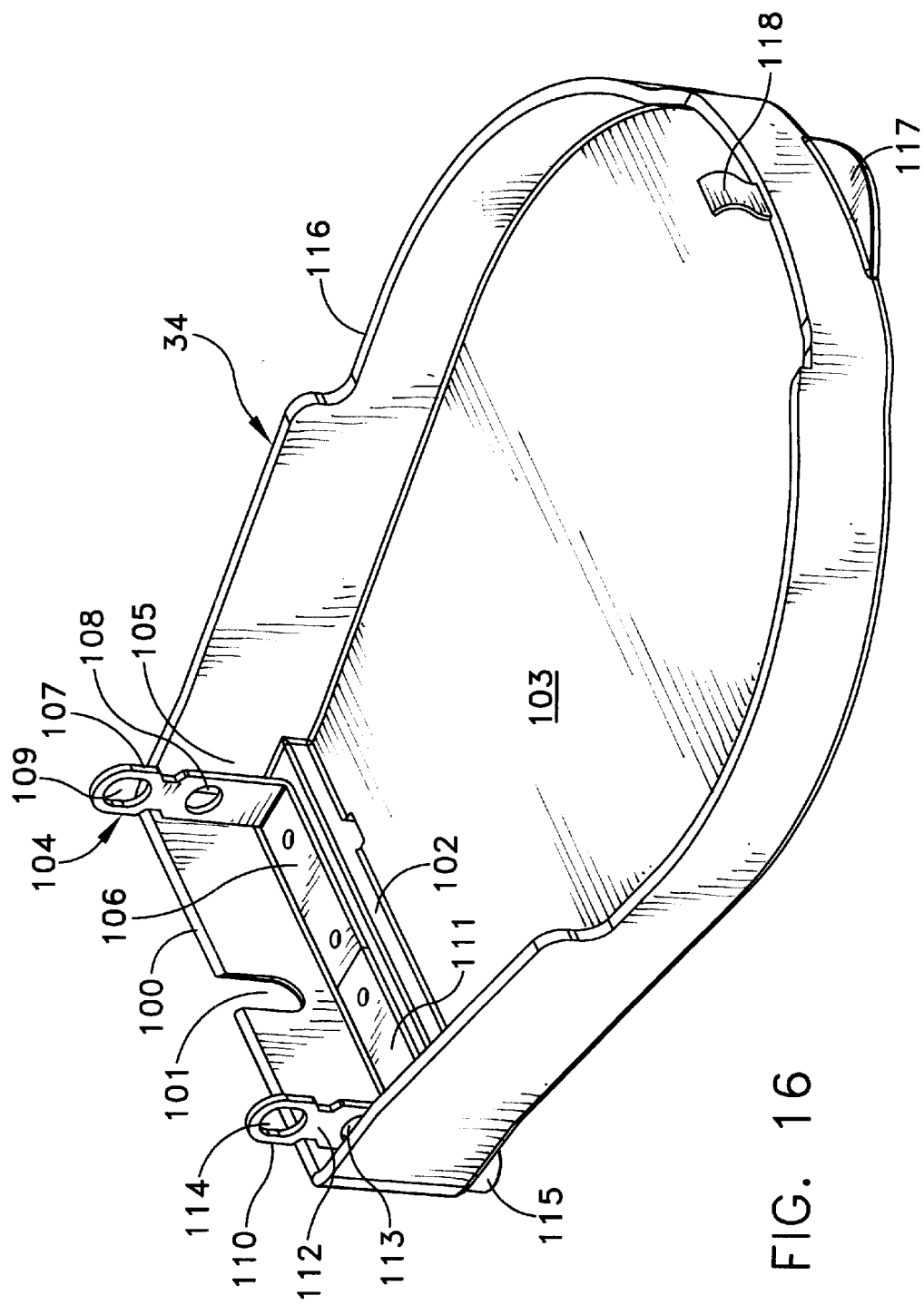
FIG. 16 is a perspective view of a base for receiving the top and bottom cooking elements.

FIG. 16 depicts the base 34 in more detail to provide an understanding of how the top and bottom cooking elements 40 and 43, with their respective contact boxes 46 and 47, are arranged. The base 34 has a rear wall 100 with an access slot 101 for the power cord 39. Adjacent the rear wall there is a strengthening step 102 formed across a floor 103. A u-shaped bracket 104 mounts to step 102. It includes two L-shaped brackets. A first L-shaped bracket 105 has a base 106 and an upstanding arm 107 with two circular apertures 108 and 109. The second L-shaped bracket 110 has a base 111 and an upstanding arm 112 with apertures 113 and 114. The apertures 108 and 113 support the pivots 89 and 90 in the contact box 47 respectively, for the lower cooking element 43. The upper apertures 109 and 114 support the pivots 59 and 60 on the upper contact box 46 for the upper cooking element 40. After this assembly, the bracket bases 106 and 111 are affixed to step 102 to lock the contact boxes in place for pivotal action about a first axis through the apertures 108 and 113 and a second, vertically spaced axis through the apertures 109 and 110.

The base 34 additionally includes a plurality of spaced feet extending from the floor 103, such as a foot 115 to space the base 34 above any supporting surface for purposes of cooling. The base 34 additionally includes a peripheral wall 116 that covers at least a portion of the bottom cooking element 40. A uniformly formed finger tab 117 extends from the wall 116 approximately level with the floor 103. The peripheral wall 116 also carries a spring clip 118 in vertical alignment with the finger tab 117.

Figure 17:
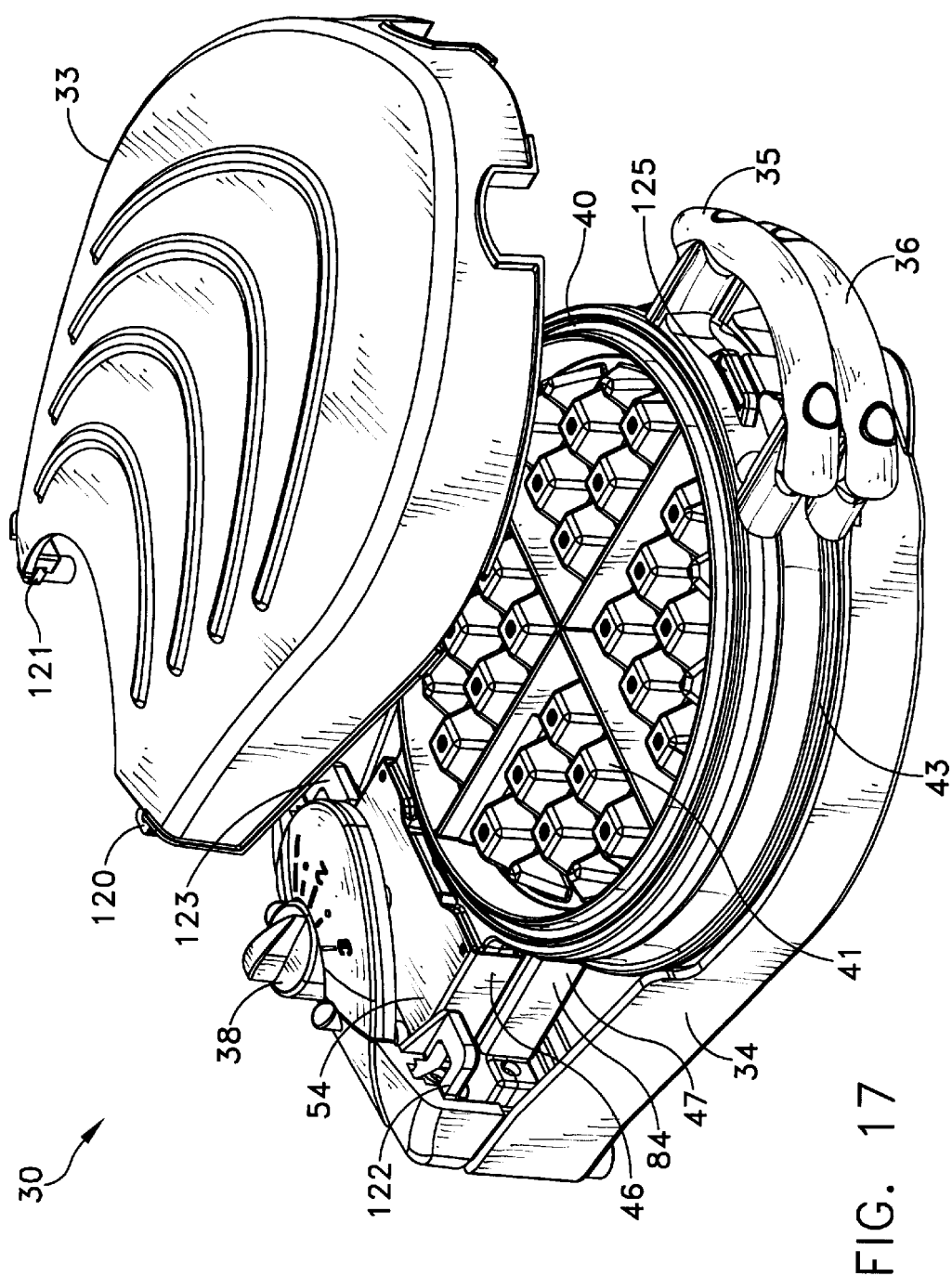
FIG. 17 is a partially exploded view of the cooking appliance in FIG. 1.

Referring now to FIG. 17, the base 34 is shown as being supported on a horizontal surface with both the contact boxes 46 and 47 being pivoted to a horizontal position thereby to carry the upper and lower cooking elements 40 and 43 by engagement of the sleeves 54 and 84, respectively. FIG. 17 depicts the appliance 30 with the cover 33 detached to expose the otherwise covered side of the upper cooking element 40 and the unused cooking surface 41 in FIG. 17.

More specifically, the cover 33 includes a pair of rearwardly extending tabs 120 and 121 that pass through apertures in brackets 122 and 123, respectively, that are attached to the control box 46. This positions the cover and prevents its forward movement. When the cover 33 is fully seated, a spring clip 124 shown in FIG. 18 and located on the inner front edge is lowered over a latch piece 125 extending from and integral with the upper cooking element 40 thereby to latch the cover 33 to the top cooking element 40. Consequently as the handle 35 moves through an arcuate motion the cover 33 remains in place thereby to provide protection from direct contact with the heating element and provide some cooling as air space exists between the upper cooking element 40 and the surface of the cover 33.

Figure 18:
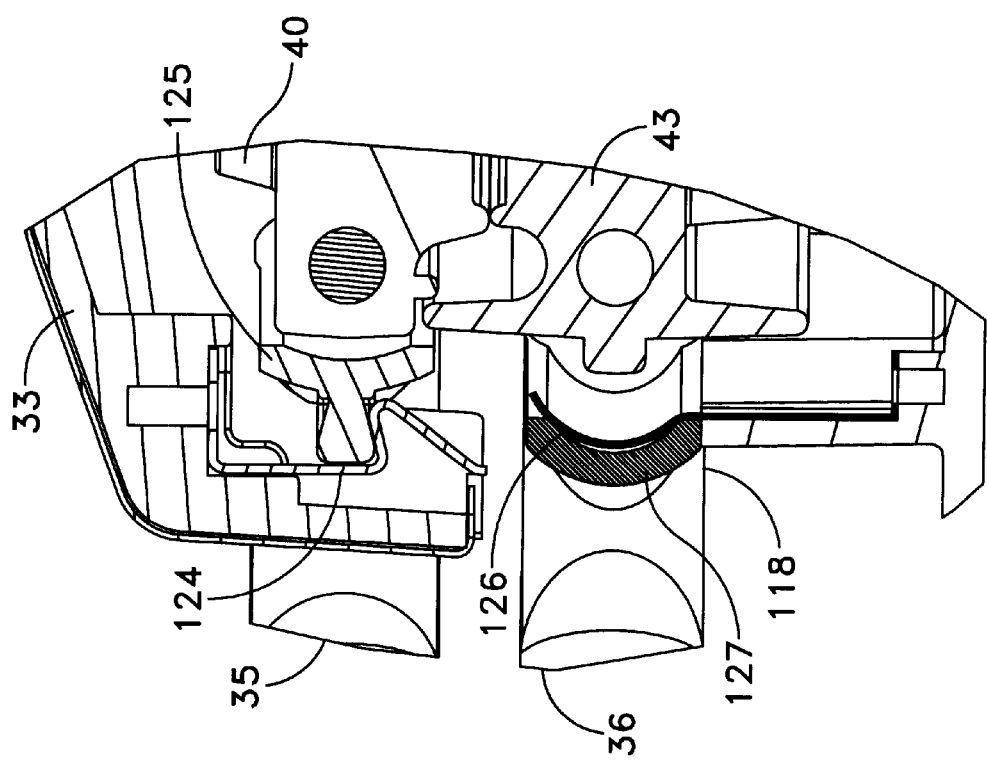
FIG. 18 is a detailed section that depicts structures for retaining removable cooking elements within their corresponding base and cover units.

Referring now to FIGS. 16 and 18, the lower heating element 43 is held in the base 34 by means of the spring clip 118. As particularly shown in FIG. 18, the spring 118 engages a concave portion 126 formed in a back frame member 127 of the handle 36. This provides a detent structure that keeps the base 34 attached to the lower heating element 43 during transport. As will be apparent, during normal operations the weight of the lower cooking element 43 keeps itself in place.

Figure 19:
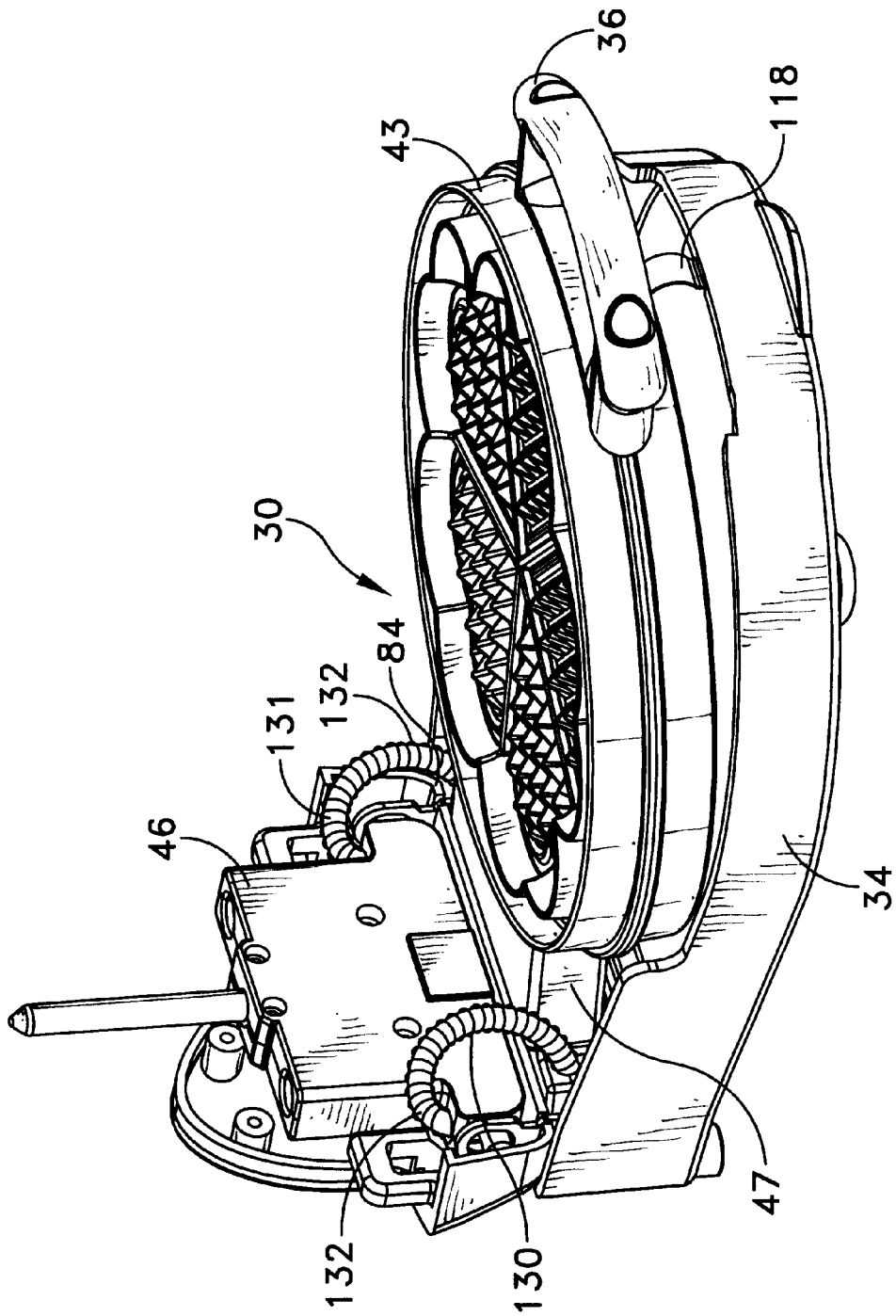
FIGS. 19 and 20 are perspective and plan views of an electrical cooking appliance with its top cooking element removed.
Figure 20:
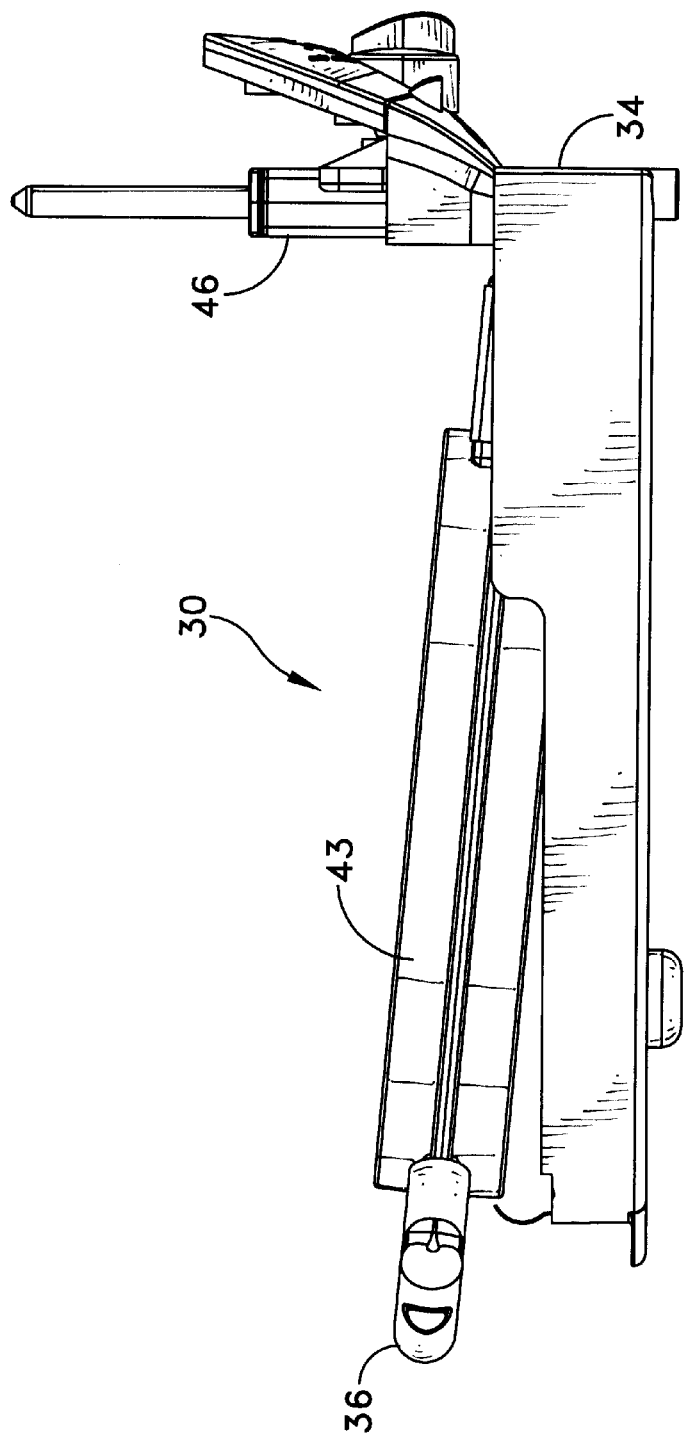

Whether the cover 33 is removed or replaced the top cooking element 40 can be pivoted to a position that is slightly past the vertical to provide a stable upright position. In this position it is a simple task to release the spring 124 and remove the cover 33. Then the top cooking element 40 can be removed merely by lifting it while maintaining some downward pressure on the base 34. When the top cooking element 40 is removed, the bottom cooking element 43 can be removed. Referring specifically to FIGS. 19 and 20, the bottom cooking element 43 pivots by lifting the handle 36 until it is clear of the base 34. As this point it is a simple matter to pull the bottom cooking element 43 from its contact box 47.

As previously indicated, an electrical connection is made between the top contact box 46 and the bottom contact box 47. FIG. 19 depicts one such connection made by two looped conductors 130 and 131. Each conductor has a protective coiled spring 132. The springs provide another benefit. When the top contact box 46 is in a vertical position, the springs 132 tend to pivot the bottom contact box 47 into an upward tilted position. This facilitates subsequent reinsertion of the lower cooking element 43 in either of its positions.

With this invention the typical approach will be to insert one of the two cooking elements, for example, the bottom cooking element 43 on its contact box 47 and then lowering it to a final position where the spring clip 118 engages the handle portion 127. Then the upper cooking element 40 can be inserted over the thermal coupler probe and onto the contact box 46. Next the handle 35 can close the upper cooking element 40 on the lower cooking element 43. The cover can readily be reinstalled by inserting the tabs 120 and 121 through the brackets 123 at a slight angle and then forcing the cover down until the spring 124 engages the latch 125.

As will now be apparent, an electrical cooking appliance constructed in accordance with this invention meets the various objectives of the invention. The appliance has two reversible cooking surfaces and uses the combination of an embedded heating element in each of the cooking elements and a thermal probe. that measures the temperature of the cooking element to permit accurate temperature control and promote even heating of any material, such as waffle dough or the like, between the cooking elements. The reversal of the cooking elements is accomplished with ease and without exposing any of the heating elements. Consequently, when the two cooking elements are removed, cleaning of the remainder of the electrical appliance is greatly facilitated. Finally, in this specifically disclosed embodiment there is shown a waffle iron that can cook two different types of waffles on reversible surfaces with accurate and even cooking of such waffles on a repetitive basis.

This invention has been disclosed in terms of a specific embodiment and is depicted for example, with circular cooking elements. Other shapes might also be used with different configurations of the internal heating element to be optimized to provide the most efficient and even heating. The cooking elements may be formed of other heat conducting materials and be coated or uncoated. Two specific waffle making surfaces have been disclosed. It will be apparent that any of a wide diversity of cooking surfaces could be substituted for one or both of these surfaces. Therefore, it is the intent of the appended claims to cover all such variations and modifications as come within the true spirit and scope of this invention.

What is claimed as new and desired to be secured by Letters Patent of the United States is:

1. An electrical cooking appliance comprising:
    A) a base,
    B) a first assembly hinged for rotation on said base about a first axis including means for electrically and mechanically supporting a first two-sided detachable cooking element with an integral, embedded heater,
    C) a second assembly hinged for rotation on said about a second axis parallel to and spaced above said first axis including means for electrically and mechanically supporting a second two-sided detachable cooking element with an integral embedded heater, and
    D) means for controlling the energization of said heaters.

2. An electrical cooking appliance as recited in claim 1 wherein said base includes first and second brackets that provide spaced first and second pivot apertures along each of the first and second axes.

3. An electrical cooking appliance as recited in claim 2 wherein each of said first and second assemblies includes a contact box with pivots for engaging said first and second pivot apertures whereby each of said contact boxes can pivot independently relative to said base.

4. An electrical cooking appliance as recited in claim 3 wherein each contact box and its respective cooking element includes a mechanical coupling that supports the respective cooking element on its respective contact box.

5. An electrical cooking appliance as recited in claim 3 wherein each contact box includes electrical connections and each contact box and its respective cooking element includes an electrical coupling that electrically connects said heater in the cooking element to the electrical connections in the respective contact box.

6. An electrical cooking appliance as recited in claim 5 wherein each contact box includes a rectangular housing and each cooking element includes a rectangular sleeve for engaging said rectangular housing.

7. An electrical cooking appliance as recited in claim 3 wherein one of said contact boxes includes electrical conductors for connection to an electrical power source and wherein said heater control means includes a temperature controller in one of the contact boxes connected to said electrical conductors and said heater thereby to control the temperature of said cooking element.

8. An electrical cooking appliance as recited in claim 7 wherein said cooking element includes a well facing said contract box and said temperature controller comprises a temperature probe positioned in said cooking element well and a thermostatic control.

9. An electrical cooking appliance as recited in claim 8 additionally comprising an electrical connection between said control boxes whereby said temperature controller controls the temperature in each of said first and second cooking elements.

10. An electrical cooking appliance as recited in claim 3 wherein each of said cooking elements has a different patterned cooking surface on opposite sides thereof.

11. A waffle iron comprising:
  A) a base having first and second sets of pivot apertures along lower and upper parallel pivot axes, respectively,
  B) a bottom contact box having pivots for engaging said first set of pivot apertures and a top contract box having pivots for engaging said second set of pivot apertures whereby said contact boxes can rotate independently relative to said base about the lower and upper axes, respectively,
  C) bottom and top cooking elements, each of said cooking elements having first and second cooking surfaces, an integral embedded heater and mechanical and electrical couplings for attaching said bottom and top cooking elements to said bottom and top contact boxes, respectively, and
  D) means in said top contact box connected to said heaters in said bottom and top cooking elements for controlling the energization of both of said heaters.

12. A waffle iron as recited in claim 11 wherein each of the contact boxes and respective cooking elements includes a mechanical coupling that supports said cooking element on its respective contact box.

13. A waffle iron as recited in claim 11 wherein each contact box includes electrical connections to said heater in the cooking element attached to the respective contact box.

14. A waffle iron as recited in claim 13 wherein each of said contact boxes includes a rectangular housing and each cooking element includes a rectangular sleeve for engaging said rectangular housing.

15. A waffle iron as recited in claim 11 wherein said top contact box includes a power cord and wherein said heater control means includes a temperature controller connected to said power cord and said heater thereby to control the temperature of said cooking element.

16. A waffle iron as recited in claim 15 wherein said cooking element includes a well facing said contact box and said temperature controller comprises a temperature probe positioned in said cooking element well and a thermostatic control.

17. A waffle iron as recited in claim 16 additionally comprising an electrical connection between said control boxes whereby said temperature controller controls the temperature in each of said first and second cooking elements.

18. A waffle iron as recited in claim 16 wherein said top control box includes a first lamp for indicating that power is applied to said electrical circuit and a second lamp for indicating that said cooking elements are at the temperature selected by said thermostatic control.

19. A waffle iron as recited in claim 11 wherein each of said mechanical and electrical couplings is symmetrical and detachable where by each said cooking element can be removed from its respective contact box and rotated to present one of two cooking surfaces.

20. A waffle iron as recited in claim 19 wherein each of the cooking surfaces has a different surface pattern.

21. An electrical cooking appliance comprising:
  A) a base;
  B) first and second two-sided detachable cooking elements each having an integral, embedded heater sealed therein,
  C) a first assembly attached to said base including means for electrically and mechanically supporting said first two-sided detachable cooking element,
  D) a second assembly hinged for rotation on said base about an axis including means for electrically and mechanically supporting said second two-sided detachable cooking element, and
  E) means for controlling the energization of said heaters.

22. An electrical cooking appliance as recited in claim 21 wherein each of said first and second assemblies includes a contact box, said contact box in said assembly having pivots for engaging said base whereby said contact box can pivot relative to said base.

23. An electrical cooking appliance as recited in claim 22 wherein each contact box and its respective cooking element includes a mechanical coupling that supports the respective cooking element on its respective contact box.

24. An electrical cooking appliance as recited in claim 22 wherein each contact box includes electrical connections and each contact box and its respective cooking element includes an electrical coupling the electrically connects said heater in the cooking element to the electrical connections in the respective contact box.

25. An electrical cooking appliance as recited in claim 24 wherein each contact box includes a rectangular housing and each cooking element includes a rectangular sleeve for engaging said rectangular housing.

26. An electrical cooking appliance as recited in claim 22 wherein one of said contact boxes includes electrical conductors for connection to an electrical power source and wherein said heater control means includes a temperature controller in one of the contact boxes connected to said electrical conductors and said heater thereby to control the temperature of said cooking element.

27. An electrical cooking appliance as recited in claim 26 wherein said cooking element includes a well facing said contract box and said temperature controller comprises a temperature probe positioned in said cooking element well and a thermosatatic control.

28. An electrical cooking appliance as recited in claim 27 additionally comprising an electrical connection between said control boxes whereby said temperature controller controls the temperature in each of said first and second cooking elements.

29. An electrical cooking appliance as recited in claim 22 wherein each of said cooking elements has a different patterned cooking surface on opposite sides thereof.

* * * * *